Patented Sept. 11, 1951

2,567,317

UNITED STATES PATENT OFFICE 2,567,317

METHOD OF MANUFACTURING LATEX ARTICLES

Jean Bonniel, La Garde, France

No Drawing. Application July 30, 1948, Serial No. 41,732. In France September 26, 1947

7 Claims. (Cl. 260—723)

The usual method currently used in the production of latex articles, which involves adding to the latex a sensitizing agent such as an ammonia salt, offers a number of drawbacks. Thus in particular it requires that the articles be washed for a comparatively long time after they have been stripped from their mold if satisfactory aging characteristics are to be attained. Moreover said washing operation is only efficacious in the case of thin-gage articles and the above-mentioned prior method consequently does not, at least in principle allow production of articles of substantial thickness.

It is an object of this invention to provide an improved method of producing latex articles, which makes it possible to mold concentrated latices at ordinary or at elevated temperatures so as to produce articles of notable gage thickness. The method essentially consists of adding to the ammoniated latex a rosin solution of a suitable concentration selected with regard to the grade of the latex to be treated, in any suitable solvent such as alcohol.

According to an important feature of the invention a zinc derivative such as zinc oxide is added to the resulting mixture to obtain ready hardening thereof in the mold. The order of succession of the addition of the rosin solution and the addition of the zinc derivative is immaterial and may be reversed.

The two examples of the practice of my invention will now be described merely by way of illustration and with no intention of restricting the scope of the invention.

Example I

From 5% to 8% of an alcohol rosin solution having a rosin concentration of about 15% are added to ammoniated latex (containing 0.5% ammonia content), and then a zinc compound such as zinc oxide, for instance, is added to the resulting mixture in an amount of one gram for each 100 grams of the dry rubber. At the end of a few minutes, the mixture is found to have set and after removal from the mold an article is obtained whose dimensions once dry are found to be substantially homothetical with those of the mold used.

Example II

A zinc compound such as zinc oxide is added to ammoniated latex concentrated or not, in the amount of one gram zinc oxide or more per kilogram dry rubber, and the resulting mixture is treated with 5% of an alcohol solution of rosin containing 15% rosin. Within a few minutes similar results are obtained as in the foregoing example.

Alternatively, the above procedure may be carried out in a single step, a mixture of a zinc compound with an alcohol rosin solution being added to the ammoniated latex.

It will be understood of course that aside from the zinc oxide or the like, sulfur and a suitable vulcanizing accelerator may be added to the composition to produce an article capable of being vulcanized after having been dried.

The new articles of manufacture formed by the articles produced by the above-described method are possessed of excellent mechanical properties, high tensile and wear resistance and very good aging characteristics. They are very readily stripped from the molds and show a remarkably fine-grained structure.

In a modified aspect of the invention, the above-described method may be applied to the manufacture of molded articles of sponge rubber. In this application, the rosin addition makes it possible to obtain a copious and stable froth, the latex being suitably churned or beaten for that purpose, as in known practice, and the subsequent addition of a zinc oxide to the froth results in a rapid solidification and the production of an ideal molded article.

What I claim is:

1. A method for transforming ammoniated latex of any concentration into a moldable material by using a zinc compound selected from the group consisting of zinc oxide, zinc chloride and zinc sulfate, comprising adding to said latex an amount of about 3 to about 10% of an alcoholic rosin solution containing about 10 to about 20% rosin.

2. A method as set forth in claim 1 wherein said rosin solution is added after said zinc compound has been introduced.

3. A method as set forth in claim 1 wherein said rosin solution is added before said zinc compound.

4. A method as set forth in claim 1 wherein said zinc compound and said rosin solution are added together.

5. A method for transforming ammoniated latex of any concentration into a moldable material by using a zinc compound from a group consisting of zinc oxide, zinc chloride and zinc sulfate, comprising adding to said latex an amount of about 5 to about 8% of an alcoholic rosin solution containing about 15% rosin.

6. A method of producing improved sponge rubber compositions which comprises adding to an ammonia preserved latex, an amount of about 3 to about 10% of an alcoholic rosin solution containing about 10 to about 20% rosin, beating the resulting mixture to produce a froth and adding a zinc compound, selected from the group consisting of zinc oxide, zinc chloride and zinc sulphate, to said froth to cause it to set to a sponge rubber composition.

7. A method of producing improved sponge rubber compositions which comprises adding to ammonia preserved latex an amount of about 5 to 8% of an alcoholic rosin solution containing about 15% rosin, beating the resulting mixture to produce a froth and adding a zinc compound, selected from the group consisting of zinc oxide, zinc chloride and zinc sulphate, to said froth to cause it to set to a sponge rubber composition.

JEAN BONNIEL.

REFERENCES CITED

The following references are of record in the file of this patent:

UNITED STATES PATENTS

| Number | Name | Date |
|---|---|---|
| 2,165,589 | Townsend | July 11, 1939 |
| 2,166,236 | Crawford | July 18, 1939 |
| 2,217,606 | Greenup | Oct. 8, 1940 |
| 2,259,350 | Merrill | Oct. 14, 1941 |
| 2,304,678 | Bush | Dec. 8, 1942 |
| 2,348,674 | Dodge et al. | May 9, 1944 |